United States Patent

Lux et al.

[11] Patent Number: 5,879,053
[45] Date of Patent: Mar. 9, 1999

[54] COLLAPSIBLE VEHICLE SEAT ASSEMBLY

[75] Inventors: Donald A. Lux, Trollhättan; Andrew J. Massara, Vargön, both of Sweden; Marcel C. Ban, Troy; Alan Sturt, West Bloomfied, both of Mich.

[73] Assignee: Lear Corporation, Southfield, Mich.

[21] Appl. No.: 948,345

[22] Filed: Oct. 9, 1997

[51] Int. Cl.$^6$ ....................................................... B60N 2/02
[52] U.S. Cl. .................................... 297/378.1; 297/452.41
[58] Field of Search .......................... 297/452.41, DIG. 3, 297/378.1, 452.18, 452.38, 451.11, 284.1, 284.6

[56] References Cited

U.S. PATENT DOCUMENTS

| | | |
|---|---|---|
| 3,151,906 | 10/1964 | Roberts . |
| 3,419,309 | 12/1968 | Smith . |
| 3,746,389 | 7/1973 | Fourrey . |
| 4,341,415 | 7/1982 | Braun et al. . |
| 4,555,140 | 11/1985 | Nemoto . |
| 5,067,771 | 11/1991 | Ellis . |
| 5,116,097 | 5/1992 | Bulgari . |
| 5,433,506 | 7/1995 | Jensen . |
| 5,482,346 | 1/1996 | Lesourd . |
| 5,492,386 | 2/1996 | Callum . |
| 5,527,087 | 6/1996 | Takeda et al. . |
| 5,529,377 | 6/1996 | Miller . |
| 5,611,589 | 3/1997 | Fujii et al. . |

*Primary Examiner*—Milton Nelson, Jr.
*Attorney, Agent, or Firm*—Brooks & Kushman P.C.

[57] ABSTRACT

A collapsible vehicle seat assembly includes a lower seat with a seat back pivotally connected to the lower seat. The seat back is pivotable between upright and collapsed positions. An inflatable air cell is positioned against the seat back and configured to cover the seat back when inflated to act as a one-piece seat back cushion. A plurality of flexible plastic fingers extend about the periphery of the air cell for preventing the air cell from extending peripherally beyond the seat back when deflated to prevent pinching of the air cell when the seat back is collapsed against the lower seat. The seat back is configured to collapse closely against the lower seat when the seat back air cell is deflated to partially compress the lower seat cushion such that the overall thickness of the collapsed seat assembly consists of a thickness less than the thickness of the lower seat alone.

12 Claims, 3 Drawing Sheets

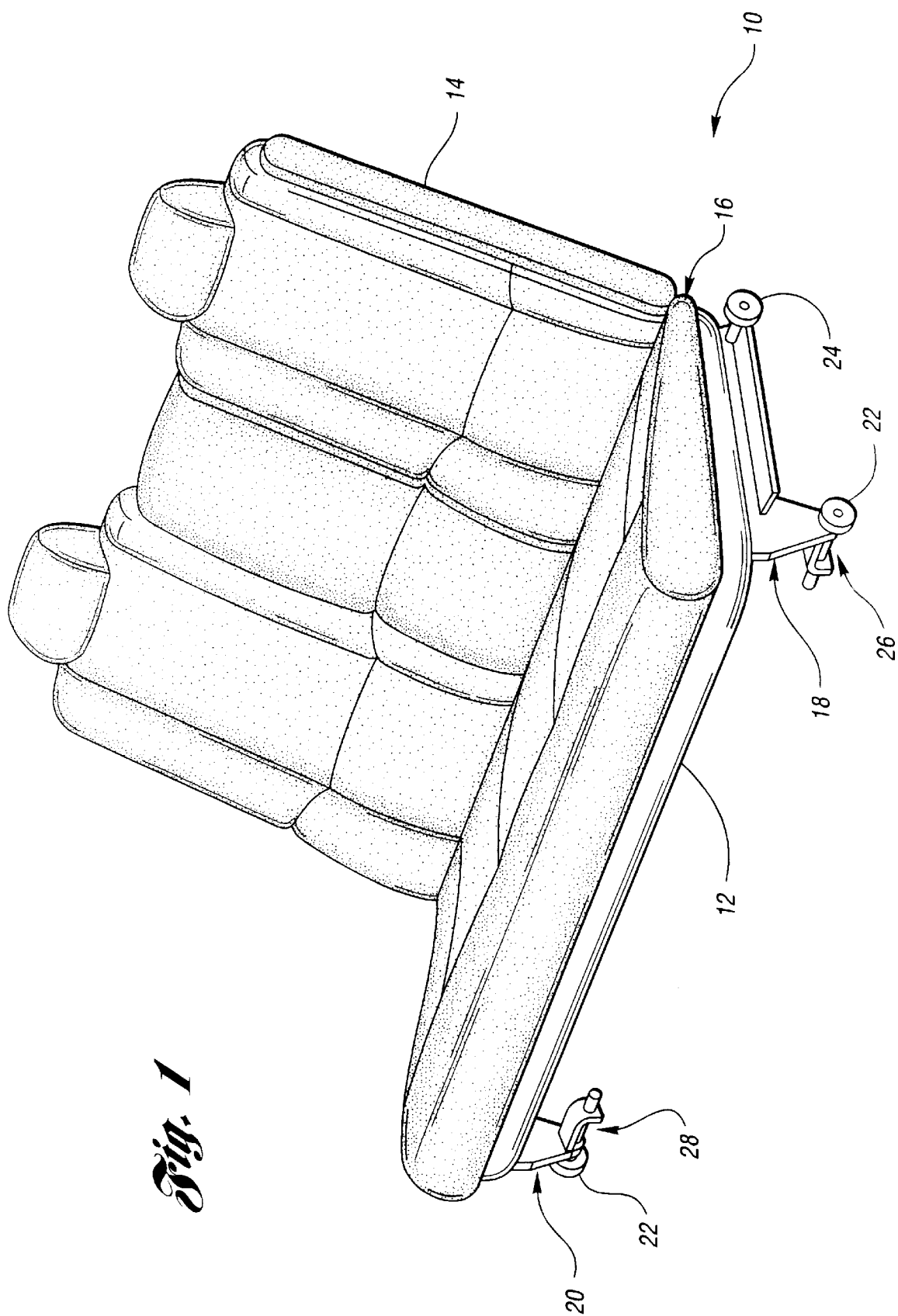

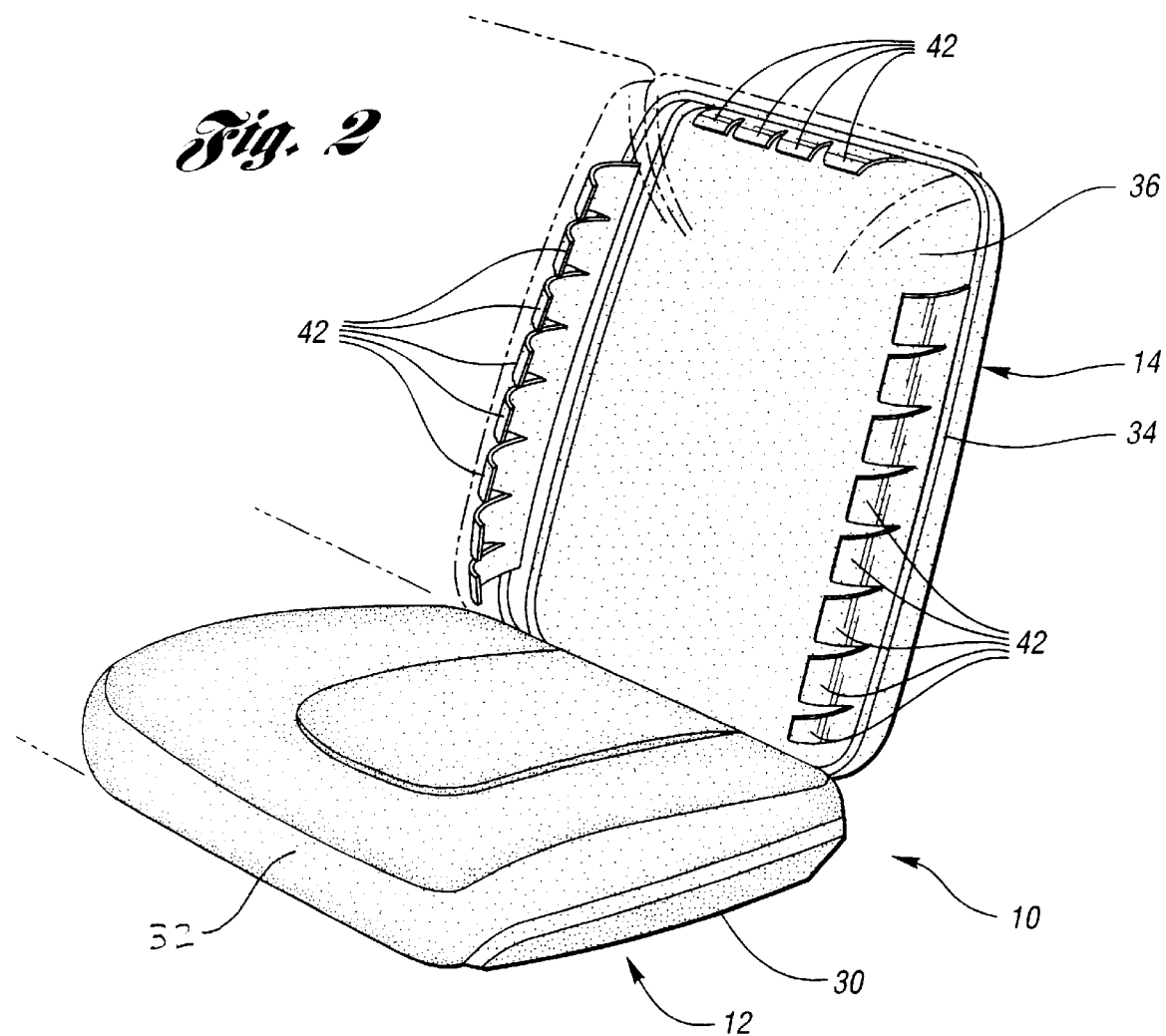
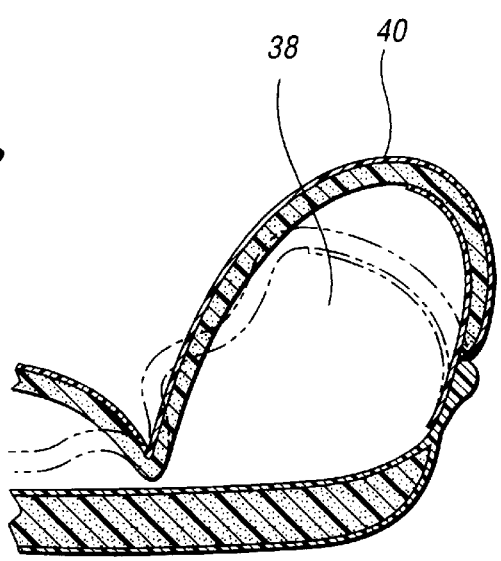

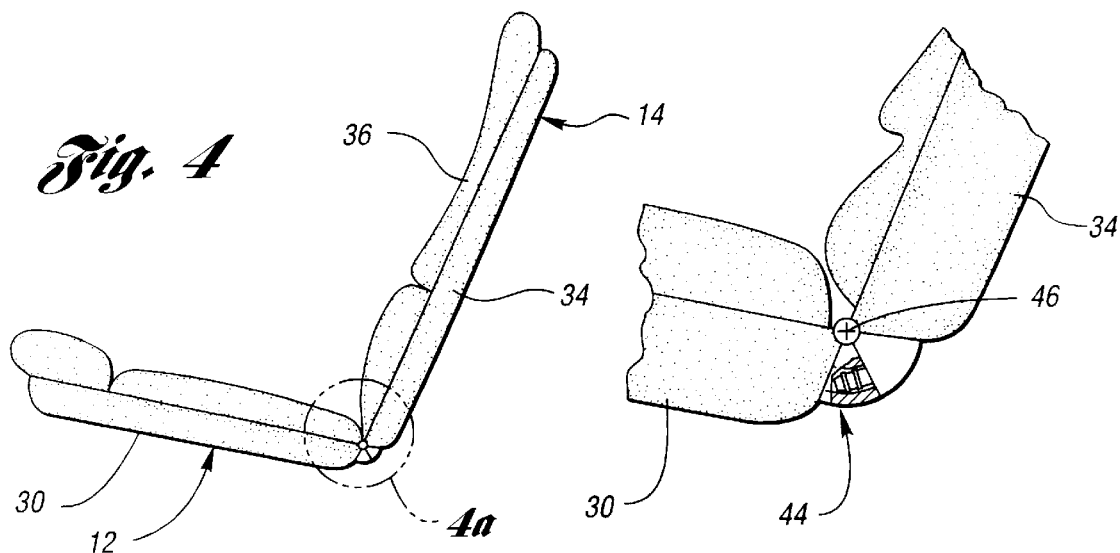
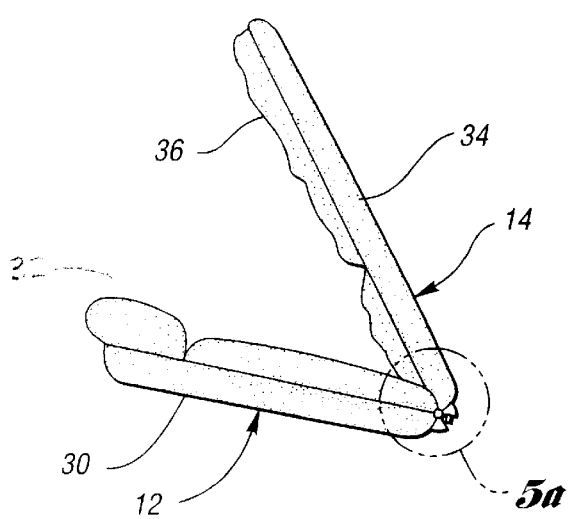
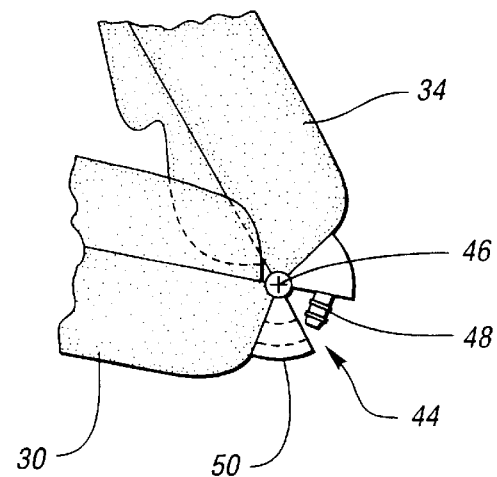
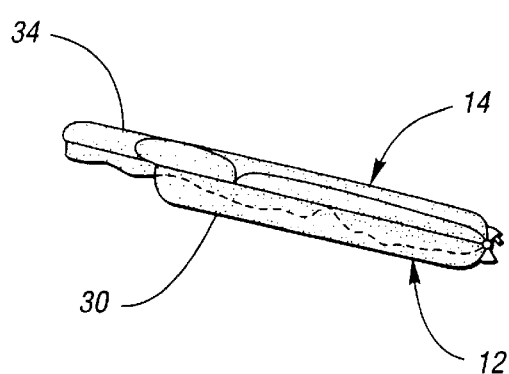

COLLAPSIBLE VEHICLE SEAT ASSEMBLY

TECHNICAL FIELD

The present invention relates to a collapsible vehicle seat assembly, and more particularly to a vehicle seat assembly with inflatable air cells acting as a lower seat cushion and a seat back cushion, the latter of which is automatically deflatable for collapse of the assembly.

BACKGROUND OF THE INVENTION

Many current vehicle designs, particularly minivans and trucks, include a removable rear seat for enhancing storage capacity of the vehicle. Such seat assemblies are typically collapsible for storage or for removal from the vehicle.

Because of vehicle seat safety, comfort, and aesthetics concerns, such collapsible vehicle seat assemblies are typically very heavy and bulky, which adds difficulty to the collapse and removal or storage of the seat assemblies. Also, because such seat assemblies are typically large assemblies with thick foam cushions, even the collapsed seat assembly takes up a substantial amount of storage space within a vehicle compartment. A typical collapsed seat would be approximately 250 mm to 350 mm thick.

Accordingly, it is desirable to provide a vehicle seat assembly of reduced weight which is collapsible to a decreased overall thickness in order to reduce the storage space required for storing the collapsed seat assembly in the vehicle.

DISCLOSURE OF THE INVENTION

The present invention overcomes the above-referenced shortcomings of prior art collapsible vehicle seat assemblies by providing such a collapsible vehicle seat assembly with a seat back cushion in which the standard foam cushion is replaced by at least one deflatable air cell which is automatically deflated as the seat back is collapsed toward the lower seat in order to facilitate minimized storage capacity requirements. A plurality of flexible plastic fingers are provided about the periphery of the air cell in order to prevent the air cell from extending peripherally beyond the edges of the seat back to prevent pinching of the air cell as the seat is collapsed.

More specifically, the present invention provides a collapsible vehicle seat assembly, including a lower seat (i.e. a lower seat frame and lower seat cushion) and a seat back pivotally connected to the lower seat. The seat back is pivotable between upright and collapsed positions. At least one inflatable air cell is positioned against the seat back and configured to cover the seat back when inflated to act as a seat back air cushion. A plurality of flexible plastic fingers extend about the periphery of the air cell for preventing the air cell from extending peripherally beyond the seat back when deflated to prevent pinching of the air cell when the seat back is collapsed against the lower seat.

The lower seat also preferably includes an inflatable air cell as a lower seat cushion which may be partially compressed when the seat back is collapsed closely adjacent the lower seat cushion such that the overall thickness of the collapsed seat assembly consists of a thickness less than the thickness of the lower seat alone when the lower seat cushion is uncompressed.

The present invention also preferably includes a means for automatically deflating the air cell as the seat back is pivoted from the upright position toward the collapsed position. The means for automatically deflating the air cell may comprise a release valve positioned adjacent the pivotal connection between the lower seat and seat back, wherein the valve is configured to automatically open when the seat back is pivoted toward the collapsed position. Alternatively, the means for automatically deflating the air cell may comprise an electrical contact operative to automatically trigger a air cell release valve when the seat back is pivoted to open or close the electrical contact. Various other embodiments are contemplated.

The inflatable air cell may comprise a urethane, coated nylon, rubber material, etc. A rubber material may be preferable because it can be blow-molded to form a specific shape. The air cell is preferably covered with a foam-backed fabric.

Accordingly, an object of the present invention is to provide a collapsible vehicle seat assembly which collapses to a substantially reduced overall thickness to minimize storage space requirements.

Another object of the present invention is to provide a collapsible vehicle seat assembly with an inflatable seat back cushion, including a plurality of flexible plastic fingers arranged about the periphery of the seat back to contain the deflated air cell to prevent pinching of the air cell when the seat back is collapsed.

Yet another object of the present invention is to provide a collapsible vehicle seat assembly with a deflatable seat back cushion, wherein the seat back cushion is automatically deflated as the seat back is collapsed toward the lower seat cushion.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a perspective view of a collapsible vehicle seat assembly in accordance with the present invention;

FIG. 2 shows a schematically arranged perspective view of a collapsible seat assembly in accordance with the invention;

FIG. 3 shows a side sectional view of an inflatable air cell and foam-backed fabric for use with the present invention;

FIG. 4 shows a side view of a collapsible seat assembly in accordance with the invention;

FIG. 4a shows an enlarged cut-away view taken at area 4a of FIG. 4;

FIG. 5 shows a side view of the seat assembly of FIG. 4, wherein the seat back is pivoting toward the collapsed position;

FIG. 5a shows an enlarged cut-away side view taken from area 5a of FIG. 5; and

FIG. 6 shows a side view of the vehicle seat assembly of FIG. 4 in a collapsed position in accordance with the present invention.

DETAILED DESCRIPTION OF THE PREFERRED EMBODIMENTS

Referring to FIG. 1, a collapsible vehicle seat assembly 10 is shown in accordance with the present invention. The collapsible vehicle seat assembly 10 is adapted for use in a van, minivan, or truck as a removable and collapsible rear seat. As shown, the seat assembly 10 includes a lower seat 12 (i.e. a lower seat frame and lower seat cushion) with a seat back 14 pivotally connected thereto at a hinge area 16. The seat assembly 10 shown is a 60–40 seat for use as a rear seat.

The seat assembly 10 shown in FIG. 1 includes riser members 18,20 at opposing ends thereof with wheels 22,24 to allow rolling of the seat assembly 10 within the vehicle. A locking mechanism 26,28 is provided on each riser member 18,20 for locking the respective front portion onto the seat floor.

Turning to FIGS. 2 and 3, a 40% section of the seat assembly shown in FIG. 1 is illustrated. As shown, the seat assembly 10 includes a lower seat shell (or frame) 30 supporting a lower seat cushion 32, and a seat back shell 34 (or "seat back") which supports a seat back cushion 36. The seat back cushion 36 comprises at least one inflatable air cell 38, which is covered by a foam-backed fabric 40, as shown in FIG. 3. As further shown in FIG. 3, the air cell 38 fits loosely within the foam-backed fabric 40. Accordingly, as shown in FIG. 2, a plurality of flexible plastic fingers 42 are provided extending from the fabric 40 about the periphery of the air cell 38 in order to prevent the air cell 38 from extending peripherally beyond the edges of the seat back shell 34 when the air cell 38 is deflated to prevent pinching of the air cell 38 when the seat back 14 is collapsed against the lower seat 12. The inflatable air cell 38 is configured to cover the front face of the seat back shell 34 to act as a one-piece seat back cushion 36.

As described below with reference to FIGS. 4–6, the vehicle seat assembly 10 is provided with a means for automatically deflating the air cell 38 as the seat back 14 is pivoted from the upright position toward the collapsed position against the lower seat 12. In one embodiment, as illustrated in FIGS. 4–6, the means for automatically deflating the air cell comprises a mechanical release valve 44 operatively positioned adjacent the pivotal connection 46 between the seat back 14 and lower seat 12, as shown in FIGS. 4a and 5a. The valve 44 is configured to automatically open to deflate the air cell 38 when the seat back is pivoted toward the collapsed position. As shown in FIGS. 4a and 5a, the release valve 44 includes a mating plug 48 and socket 50 connected, respectively, to the seat back 14 and lower seat 12, and in fluid communication with the air cell 38.

Accordingly, as the seat back 14 is collapsed toward the lower seat 12, the plug 48 is automatically withdrawn out of the socket 50 in order to release the valve to deflate the air cell 38. Similarly, as the seat back 14 is returned to the upright position, the plug 48 automatically enters the socket 50 to close the valve to allow inflation of the air cell 38 by a compressor or air pump.

A concern with such a design is that the mechanical release valve 44 may become dirty when operated. Accordingly, an alternative embodiment would provide an electrical contact which is closed or opened to trigger operation of a dump valve which is protected by a filter. Such an embodiment would avoid the potential problem with dirt or debris plugging the mechanical valve.

As illustrated sequentially in FIGS. 4–6, the seat back 14 is collapsed toward the lower seat cushion 32 (which also preferably comprises at least one inflatable air cell), and the seat back air cushion 36 automatically deflates in order to allow the seat back shell 34 to nest over the lower seat shell 30 to provide a thin folded package for handling or storage of the seat assembly 10. In the collapsed position shown in FIG. 6, a latch may be provided for latching the seat back 14 against the lower seat 12.

Also, in the collapsed position shown in FIG. 6, the forward portion of the inflatable lower seat cushion 32 is compressed, which decreases the overall thickness of the assembly to a thickness which is less than the normal thickness of the lower seat alone. Accordingly, this configuration greatly enhances handling and storage by reducing both weight and bulkiness from the collapsible and removable seat assembly 10. Preferably, the overall collapsed thickness of the seat assembly is approximately 100 millimeters, as compared to a typical prior art collapsed seat assembly which is generally 250–350 millimeters thick, not including the riser.

An advantage of the inflatable air cells 32,38 is that comfort may be enhanced for the vehicle occupant because pressure points can be reduced as pressure is more evenly distributed about the seat. The air cells may be a urethane, coated nylon, rubber material, etc. A rubber material may be desirable because it can be blow molded to a specific shape.

A compressor may be provided on the vehicle with air tubes for fluid connection with the air cell 38 in the seat back. Also, the periphery of the air cell 38 could be sewn into the foam-backed fabric trim cover 40 and the plastic fingers 42 may be part of the trim cover.

While the best modes for carrying out the invention have been described in detail, those familiar with the art to which this invention relates will recognize various alternative designs and embodiments for practicing the invention within the scope of the appended claims.

What is claimed is:

1. A collapsible vehicle seat assembly, comprising:
   a lower seat;
   a seat back pivotally connected to the lower seat, and pivotable between upright and collapsed positions;
   at least one inflatable seat back air cell positioned against the seat back and configured to cover the seat back when inflated to act as a seat back cushion; and
   a plurality of flexible plastic fingers extending about the periphery of the air cell for preventing the air cell from extending peripherally beyond the seat back when deflated to prevent pinching of the air cell when the seat back is collapsed against the lower seat.

2. The vehicle seat assembly of claim 1, wherein said seat back air cell is covered by a foam-backed fabric.

3. The vehicle seat assembly of claim 1, wherein said lower seat includes a lower seat shell and lower seat cushion, said lower seat cushion comprising at least one inflatable lower seat air cell.

4. The vehicle seat assembly of claim 1, further comprising means for automatically deflating the seat back air cell as the seat back is pivoted from the upright position toward the collapsed position.

5. The vehicle seat assembly of claim 4, wherein said means for automatically deflating the seat back air cell comprises a release valve positioned adjacent the pivotal connection between the lower seat and seat back, wherein the valve is configured to automatically open when the seat back is pivoted toward the collapsed position.

6. The vehicle seat assembly of claim 5, wherein said release valve comprises a mating plug and socket connected, respectively, to the seat back and lower seat, and in fluid communication with the seat back air cell.

7. A collapsible vehicle seat assembly, comprising:
   a lower seat including a lower seat frame and lower seat cushion, said lower seat cushion consisting of an inflatable lower seat cushion air cell;
   a seat back pivotally connected to the lower seat, and pivotable between upright and collapsed positions;
   a deflatable seat back air cell positioned against the seat back and configured to cover the seat back when inflated to act as a seat back cushion; and wherein the seat back is configured to collapse closely against the lower seat when the seat back air cell is deflated to partially compress the lower seat cushion air cell such that the overall thickness of the collapsed seat assembly consists of a thickness less than the thickness of the lower seat alone when the lower seat cushion air cell is uncompressed; and a plurality of flexible plastic fingers extending about the periphery of the seat back air cell for preventing the seat back air cell from extending peripherally beyond the seat back when deflated to prevent pinching of the seat back air cell when the seat back is collapsed against the lower seat.

8. The vehicle seat assembly of claim 7, further comprising means for automatically deflating the seat back air cell as the seat back is pivoted from the upright position toward the collapsed position.

9. The vehicle seat assembly of claim 8, wherein said means for automatically deflating the seat back air cell comprises a release valve positioned adjacent the pivotal connection between the lower seat and seat back, wherein the valve is configured to automatically open when the seat back is pivoted toward the collapsed position.

10. The vehicle seat assembly of claim 9, wherein said release valve comprises a mating plug and socket connected, respectively, to the seat back and lower seat and in fluid communication with the air cell.

11. The vehicle seat assembly of claim 10, wherein said seat back air cell is covered by a foam-backed fabric.

12. A collapsible vehicle seat assembly, comprising:
a lower seat including a lower seat cushion frame and lower seat cushion consisting of an inflatable lower seat cushion air cell;

a seat back pivotally connected to the lower seat, and pivotable between upright and collapsed positions;

at least one inflatable seat back air cell positioned against the seat back and configured to cover the seat back when inflated to act as a seat back cushion; and means for automatically deflating the seat back air cell as the seat back is pivoted from the upright position toward the collapsed position;

wherein the seat back is configured to collapse closely against the lower seat when the seat back air cell is deflated to partially compress the lower seat cushion air cell such that the overall thickness of the collapsed seat assembly consists of a thickness less than the thickness of the lower seat alone when the lower seat cushion air cell is uncompressed.

* * * * *